United States Patent
Urababa et al.

(10) Patent No.: US 8,027,765 B2
(45) Date of Patent: Sep. 27, 2011

(54) VEHICLE STABILIZER SYSTEM

(75) Inventors: Shingo Urababa, Toyota (JP); Satoshi Suzuki, Mishima (JP); Yoshihiro Iida, Mishima (JP); Takashi Sugano, Hiroshima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 959 days.

(21) Appl. No.: 11/917,052

(22) PCT Filed: Jun. 9, 2006

(86) PCT No.: PCT/JP2006/312185
§ 371 (c)(1),
(2), (4) Date: Dec. 10, 2007

(87) PCT Pub. No.: WO2006/135072
PCT Pub. Date: Dec. 21, 2006

(65) Prior Publication Data
US 2009/0112400 A1    Apr. 30, 2009

(30) Foreign Application Priority Data
Jun. 16, 2005  (JP) ................................. 2005-176884

(51) Int. Cl.
*B60G 17/016* (2006.01)
(52) U.S. Cl. .................. 701/38; 701/1; 701/36; 701/37; 280/5.5; 280/5.504; 280/5.511; 280/124.1; 280/124.152
(58) Field of Classification Search ...................... 701/38
See application file for complete search history.

(56) References Cited

U.S. PATENT DOCUMENTS

| | | | | |
|---|---|---|---|---|
| 4,973,077 A * | 11/1990 | Kuwayama et al. | ... | 280/124.107 |
| 5,441,298 A * | 8/1995 | Miller et al. | ............... | 280/5.501 |
| 6,088,637 A * | 7/2000 | Acker et al. | ..................... | 701/38 |
| 6,354,607 B1 * | 3/2002 | Kawashima et al. | ...... | 280/5.511 |
| 6,425,585 B1 * | 7/2002 | Schuelke et al. | ........... | 280/5.511 |
| 7,100,926 B2 * | 9/2006 | Osterlanger et al. | ........ | 280/5.502 |
| 7,162,945 B2 * | 1/2007 | Tatsuya et al. | .................. | 91/441 |
| 7,605,555 B2 * | 10/2009 | Kurokochi | .................... | 318/376 |
| 7,798,498 B2 * | 9/2010 | Buma | ........................ | 280/5.511 |
| 2002/0180167 A1 * | 12/2002 | Schmidt et al. | ............ | 280/5.511 |

(Continued)

FOREIGN PATENT DOCUMENTS

EP    1 362 720    11/2003

(Continued)

*Primary Examiner* — Khoi Tran
*Assistant Examiner* — Jonathan Sample
(74) *Attorney, Agent, or Firm* — Oblon, Spivak, McClelland, Maier & Neustadt, L.L.P.

(57) ABSTRACT

A stabilizer system for a vehicle that includes a stabilizer bar and an actuator for changing stiffness of the stabilizer bar, an electric current to be supplied to an electric motor that is a drive source of the actuator is changed based on various parameters. The supply current is made smaller in a situation in which an operational direction of the actuator is toward a neutral position, than in another situation. Further, the supply current is made smaller with an increase in a distance of the operational position of the actuator from the neutral position. Moreover, the supply current is made larger with an increase in a steering speed. In detail, when the supply current is determined by multiplying a basic supply current by a control gain, the control gain is set to change depending upon the above-indicated parameter, whereby the supply current is changed based on the parameters.

16 Claims, 8 Drawing Sheets

U.S. PATENT DOCUMENTS

| | | | |
|---|---|---|---|
| 2003/0111805 A1* | 6/2003 | Carlstedt et al. | 280/5.508 |
| 2005/0023789 A1 | 2/2005 | Suzuki et al. | |
| 2005/0067213 A1* | 3/2005 | Yasui et al. | 180/443 |
| 2005/0079066 A1* | 4/2005 | Tatsuya et al. | 417/313 |
| 2005/0179220 A1 | 8/2005 | Yasui et al. | |
| 2005/0179221 A1 | 8/2005 | Yasui et al. | |
| 2005/0211518 A1* | 9/2005 | Kraus et al. | 188/321.11 |
| 2005/0236793 A1 | 10/2005 | Taneda et al. | |
| 2005/0264247 A1* | 12/2005 | Buma et al. | 318/432 |
| 2005/0275172 A1* | 12/2005 | Song | 280/5.511 |
| 2006/0113740 A1* | 6/2006 | Green | 280/124.107 |
| 2006/0138732 A1 | 6/2006 | Buma et al. | |
| 2009/0008887 A1* | 1/2009 | Buma | 280/5.511 |
| 2010/0324780 A1* | 12/2010 | Koumura et al. | 701/38 |

FOREIGN PATENT DOCUMENTS

| | | |
|---|---|---|
| EP | 1 491 371 | 12/2004 |
| EP | 1 518 721 | 3/2005 |
| EP | 1 564 042 | 8/2005 |
| EP | 1 564 043 | 8/2005 |
| EP | 1 600 313 | 11/2005 |
| EP | 1 679 208 | 7/2006 |
| JP | 1 257614 | 10/1989 |
| JP | 2000-71738 | 3/2000 |
| JP | 2000 71739 | 3/2000 |
| JP | 2005-96672 | 4/2005 |
| JP | 2005 145360 | 6/2005 |
| JP | 2005-225301 | 8/2005 |
| KR | 2002-0039707 | 5/2002 |
| WO | 2004 085179 | 10/2004 |

* cited by examiner (a)

CONTROL GAIN Kθ

TARGET MOTOR ROTATIONAL ANGLE θ*

(b)

CONTROL GAIN Kv

STEERING SPEED Vδ

VEHICLE STABILIZER SYSTEM

TECHNICAL FIELD

The present invention relates in general to a stabilizer system installed on a vehicle for reducing or restraining roll of a body of the vehicle, and more particularly to such a stabilizer system in which rigidity of a stabilizer bar is changeable by an actuator having an electric motor.

BACKGROUND ART

In recent years, there has been developed a so-called "active stabilizer system", in detail, a stabilizer system in which stiffness or rigidity of a stabilizer bar is changed for thereby effectively controlling or restraining roll of a vehicle body. For instance, JP-A-2002-518245 disclose a stabilizer system equipped with an actuator which has an electric motor and which changes the stiffness of the stabilizer bar with respect to the roll of the vehicle body. By controlling the operation of the actuator, the roll of the vehicle body is effectively restrained or suppressed. JP-A-2005-35515 discloses, for controlling the stabilizer system, a method of determining an amount of electric power to be supplied to the electric motor based on roll-restraining moment to be exhibited by the stabilizer bar.

DISCLOSURE OF THE INVENTION

(A) Summary of the Invention

While the method of determining the supply power amount to the electric motor disclosed in the above-indicated Publication JP-A-2005-35515 is one of suitable methods, there is a room for improvement in the method of determining the supply power amount and it is possible to improve the utility of the stabilizer system by devising or modifying the determining method. The present invention has been developed in the light of the situations and it is an object of the invention to provide a stabilizer system with high utility.

To achieve the above-indicated object, the present invention provides a vehicle stabilizer system equipped with an actuator which has an electric motor and which changes stiffness of a stabilizer bar with respect to roll of a body of the vehicle, wherein an amount of power to be supplied to the electric motor is determined based on at least one determination parameter selected from: an operational direction of the actuator with respect to a neutral position; an operational position of the actuator; and a steering speed.

As explained in detail below, the above-indicated parameters relate to ease with which the actuator is operated and a speed at which the actuator should be operated. Accordingly, by determining the supply power amount to the electric motor based on at least any of the parameters, the operation of the actuator, in detail, the operation of the stabilizer apparatus constituted by including the stabilizer bar and the actuator, can be made appropriate. Therefore, according to the present invention, a stabilizer system with high utility can be realized.

(B) Forms of Invention

There will be described in detail various forms of an invention which is considered claimable (hereinafter may be referred to as "claimable invention"). Each of the forms of the invention is numbered like the appended claims and depends from the other form or forms, where appropriate, for easier understanding of the claimable invention. It is to be understood that the invention is not limited to the technical features or any combinations thereof which will be described, and shall be construed in the light of the following descriptions of the various forms and preferred embodiments of the invention. It is to be further understood that a plurality of elements or features included in any one of the following forms of the invention are not necessarily provided all together, and that any form in which one or more elements or one or more features is/are added to any one of the following forms and any form in which one or more elements or one or more features is/are deleted from any one of the following forms may be considered claimable.

In the following forms, the forms (1)-(15) respectively correspond to claims 1-15.

(1) A stabilizer system for a vehicle comprising:

a stabilizer bar connected to left and right wheels at respective opposite ends thereof;

an actuator which has an electric motor and which changes, owing to motor force generated by the electric motor, stiffness of the stabilizer bar with respect to roll of a body of the vehicle according to an operational position of the actuator; and a control device which controls the actuator such that an actual operational position of the actuator coincides with a target operational position while controlling a supply power amount to be supplied to the electric motor, wherein the control device determines the supply power amount to the electric motor based on at least one determination parameter selected from: an operational direction of the actuator with respect to a neutral position; the operational position of the actuator; and a steering speed.

The stabilizer system is designed to generate roll-restraining moment that counts roll moment acting on the vehicle body. Although it is not necessary to generate the roll-restraining moment in a normal state in which no roll moment acts on the vehicle body, the roll-restraining moment needs to be generated when the state of the vehicle body deviates from the normal state. Accordingly, in the stabilizer system equipped with the actuator, in general, the actuator is kept in a state in which the actuator receives external force arising from the roll moment (hereinafter may be referred to as "external input force") while the vehicle body undergoes the roll moment. For instance, where the operational position of the actuator in the above-indicated normal state is defined as "neutral position", the ease with which the actuator is operated by the force of the electric motor (the motor force) differs depending upon the operational direction with respect to the neutral position. The operational direction means a direction in which the actuator is operated by the force of the electric motor. Described more specifically, when the operational direction of the actuator coincides with a direction away from the neutral position (hereinafter may be referred to as "counter-neutral direction"), a relatively large magnitude of the motor force is required for operating the actuator against the external input force. On the contrary, when the operational direction of the actuator coincides with a direction toward the neutral position (hereinafter may be referred to as "neutral direction"), the magnitude of the motor force to be required may be small because the operational direction and a direction in which the external input force acts agree with each other. Therefore, where the force exerted by the electric motor is generally in proportion to the supply power amount, the operation of the actuator, namely, the operation of the stabilizer apparatus constituted by including the stabilizer bar and the actuator can be made appropriate by determining the supply power amount based on the operational direction of the actuator with respect to the neutral position.

The stabilizer apparatus constructed as described above is arranged to change stiffness of the stabilizer bar with respect to roll of the vehicle body (hereinafter may be referred to as "stabilizer stiffness") depending upon the operational position of the actuator. In general, the stabilizer stiffness is increased with an increase in the roll moment acting on the vehicle body. Further, when the above-indicated neutral position is deemed as a reference of the operational position of the actuator, the stabilizer stiffness is arranged to be increased with an increase in a distance of the operational position from the neutral position. Accordingly, as the operational position of the actuator moves apart from the neutral position, the external input force applied to the actuator becomes large. Thus, the ease with which the actuator is operated (operation ease) differs depending upon the operational position of the actuator. Accordingly, by determining the supply power amount on the basis of the operational position of the actuator, the operation of the actuator, namely, the operation of the stabilizer apparatus, can be made appropriate.

The vehicle body undergoes the roll moment during turning. The roll moment increases with an increase in a steering amount that means deviation of a steering position from a position (neutral position) in a straightforward-running state of the vehicle, and a rate of change of the roll moment depends on a steering speed that means a rate of change of the steering amount. In the meantime, when the rate of the change of the roll moment is large, the actuator need to be operated rapidly and therefore a comparatively large magnitude of the force of the electric motor is needed. On the contrary, when the rate of change of the roll moment is small, it is desirable that the actuator be operated comparatively slowly. In this instance, the magnitude of the electric motor is small. Accordingly, by determining the supply power amount to the electric motor on the basis of the steering speed, the operation of the actuator, namely, the operation of the stabilizer apparatus, can be made appropriate.

In the stabilizer system according to the above-indicated form, the supply power amount to the electric motor as a drive source for the actuator is determined based on at least one prescribed determination parameter selected from: the operational direction of the actuator with respect to the neutral position; the operational position of the actuator; and the steering speed. Accordingly, by making the supply power amount appropriate, the operation of the actuator, i.e., the operation of the stabilizer apparatus, can be made appropriate. Moreover, the stabilizer system according to the present form is excellent in the light of power saving by the appropriately determined supply power amount. In consequence, it is possible to realize a vehicle stabilizer system with high utility.

Where the operational direction of the actuator with respect to the neutral position is employed as the determination parameter, the operational direction may be identified to be the neutral direction when the target operational position of the actuator is nearer to the neutral position than the actual operational position, for instance. Similarly, the operational direction may be identified to be the counter-neutral direction when the actual operational position is nearer to the neutral position than the target operational position. Where the actuator is arranged such that the operational direction thereof and the operational direction of the electric motor can be related to each other, the operational direction of the electric motor is regarded as the operational direction of the actuator, whereby the supply power amount can be determined based on the operational direction of the electric motor. Similarly, where the operational position of the actuator is employed as the determination parameter and the actuator is arranged such that the operational position thereof and the operational position of the electric motor can be related to each other, the operational position of the electric motor is regarded as the operational position of the actuator, whereby the supply power amount can be determined based on the operational position of the electric motor. The operational position of the actuator and the operational position of the electric motor may be either of the target operational position or the actual operational position. Further, where the steering speed is employed as the determination parameter, the steering speed may be a steering speed of steering operating member such as an operation angle speed in operation of a steering wheel or a speed of change in steered amounts of the wheels such as a moving speed of a steering rod connecting the right and left wheels. When the supply power amount is changed, at least one of an amount of current to be supplied to the motor and a voltage to be applied to the motor may be changed depending upon the structures of the motor and the power source for the motor, and so on. For instance, where the electric motor is controlled under a constant voltage, the supply current amount to the motor may be changed. In this instance, the supply power amount is determined by determining the supply current amount.

In the above-indicated form, the structure of the stabilizer apparatus is not particularly limited. For instance, the stabilizer apparatus may be configured as follows: The actuator is disposed between one end of the stabilizer bar and a wheel-hold member to which the one end of the stabilizer bar is connected. A distance between the above-indicated one end of the stabilizer bar and the wheel-hold member is suitably adjusted by the actuator, whereby the stiffness of the stabilizer bar is arranged to be changeable. Alternatively, the stabilizer apparatus may be configured as follows: The stabilizer bar employed in current ordinary vehicles is divided into two, namely, a pair of stabilizer bar members between which the actuator is disposed. The pair of stabilizer bar members are rotated relative to each other by the actuator, whereby the stiffness of the stabilizer bar is arranged to be changeable. In this form (1), the structure of "actuator" is not particularly limited. The actuator may include, in addition to the electric motor, a decelerator, a mechanical brake, etc. As "electric motor", any type may be employed. For instance, there may be employed a DC brushless motor, an induction motor, a synchronous motor, a stepping motor or a reluctance motor. From the viewpoint of motion, either a rotary motor or a linear motor may be employed.

In the above-indicated form, "control apparatus" executes control so as to change the stiffness of the stabilizer bar with respect to the roll of the vehicle, i.e., the stabilizer stiffness. "Stabilizer stiffness" stated herein mainly means twisting stiffness, for instance. To "change the stiffness" does not mean changing stiffness as physical values of the stabilizer bar itself, but means changing so-called apparent stiffness. Mentioned concretely, to "change the stiffness" means changing a relationship between: a relative displacement amount of each of the opposite ends of the stabilizer bar at which the stabilizer bar is connected to the left and right wheels, respectively, (strictly, to respective wheel-hold members such as suspension arms); and the roll-restraining moment to be generated. In detail, to "change the stiffness" means changing the magnitude of the roll-restraining moment generated by the stabilizer bar by changing the twisting amount of the stabilizer bar when the roll amount of the vehicle body (it may be referred to as the roll angle) becomes equal to a certain value, conversely, changing the degree of the roll amount of the vehicle body when the roll-restraining moment with a certain magnitude is to be generated. In the present form, the stabilizer stiffness is arranged to be changeable, thereby effectively controlling the roll amount of the vehicle body when the vehicle body is undergoing the roll moment. The present control apparatus executes control in which the actual operational position of the actuator coincides with the target operational position for changing the stabilizer stiffness. That is, the present control device executes so-called position control in which the operational position of the actuator is a direct subject to be controlled. By employing the above-indicated position control in place of so-called output force control in which the force exerted by the actuator is a direct subject to be controlled, the stabilizer system according to the present form is suitable in actively controlling the stabilizer stiffness, for instance. The control device may be principally constituted by a computer, for instance.

(2) The stabilizer system according to the above form (1), wherein the at least one determination parameter includes at least the operational direction of the actuator with respect to a neutral position.

(3) The stabilizer system according to the above form (1) or (2), wherein the at least one determination parameter includes at least the operational position of the actuator.

(4) The stabilizer system according to any one of the above forms (1)-(3), wherein the at least one determination parameter includes at least the steering speed.

The above-indicated forms (2)-(4) employ, as the at least one determination parameter, the operational direction of the actuator with respect to the neutral position, the operational position of the actuator and the steering speed, respectively. Depending upon the parameter to be employed, the stabilizer system having the characteristic in accordance with the employed parameter is realized. Only one of, or at least two of, the three parameters may be employed.

(5) The stabilizer system according to any one of the above forms (1)-(4), wherein the control device includes a target-operational-position determining portion which determines the target operational position based on a roll-moment index amount which indicates roll moment that acts on the body of the vehicle.

The above-indicated form is one concrete form related to control for obtaining the stabilizer stiffness in accordance with the roll moment acting on the vehicle body. According to this form, it is possible to actively change the stabilizer stiffness corresponding to the change in the roll moment. "Roll-moment index amount" stated here is a parameter which directly or indirectly indicates the magnitude of the roll moment that the vehicle body receives. Generally speaking, the roll-amount index amount is various sorts of physical quantity capable of indicating what degree of magnitude of roll moment the vehicle receives. Explained more specifically, the roll-moment index amount corresponds to the steering angle of the vehicle, the lateral acceleration occurring in the vehicle body, the yaw rate occurring in the vehicle, cornering force acting on the vehicle, lateral force and a slip angle of the vehicle, in addition to the roll moment per se. One kind or plural kinds of the roll-moment index amount may be employed in determining the target operational position. The roll-moment index amount may be obtained by actual measurement or detection or may be obtained by estimating based on at least one another roll-moment index amount. Among various kinds of the roll-moment index amount indicated above, the lateral acceleration and the yaw rate are preferable as the determination parameter on the basis of which the target operational position is determined, for the reasons that the lateral acceleration and the yaw rate are comparatively easily detected and estimated, for instance.

(6) The stabilizer system according to any one of the above forms (1)-(5), wherein the control device includes, for determining the supply power amount to the electric motor, a basic-supply-power-amount determining portion which determines a basic supply power amount as a basis of the supply power amount to the electric motor and a supply-power-amount correcting portion which corrects the base supply power amount based on the at least one determination parameter.

The above-indicated form includes, for instance, a form in which a control gain is set as a coefficient to be multiplied by the basic supply power amount and the value of the control gain is changed based on the aforementioned determination parameter. According to the present form, the supply power amount can be easily changed based on the determination parameter.

(7) The stabilizer system according to the above form (6), wherein the basic-supply-power-amount determining portion determines the basic supply power amount based on an operational-position deviation of the actual operational position from the target operational position.

The above-indicated form is a form in which a technique of determining the basic supply power amount is limited. According to the present form, the position control of the actuator can be effectively executed.

(8) The stabilizer system according to the above form (7), wherein the basic-supply-power-amount determining portion determines the basic supply power amount according to one of a PI control rule based on the operational-position deviation and a PDI control rule based on the operational-position deviation.

In the above-indicated form (8), the basic supply power amount is determined as a sum of a proportional-term component which is proportional to the operational-position deviation and an integral-term component corresponding to an integral value of the operational-position deviation or a sum of the proportional-term component, the integral-term component and a differential-term component corresponding to a rate of change of the operational-position deviation. Among these components, the integral-term component can be considered as a component for eliminating steady-state deviation, and a component for permitting the electric motor to exhibit position-maintaining force, for inhibiting the actuator from being operated even by the external input force. According to this form, a variation in the operational position of the actuator by the external input force is suppressed owing to the presence of the integral-term component, thereby realizing the stabilizer system that assures stable operation of the stabilizer apparatus.

(9) The stabilizer system according to any one of the above forms (1)-(8), wherein the at least one determination parameter includes at least the operational direction of the actuator with respect to the neutral position, and wherein the control device determines the supply power amount to be a value that is smaller in a neutral-direction operational state in which the operational direction of the actuator is toward the neutral position, than in a counter-neutral-direction operational state in which the operational direction of the actuator is away from the neutral position.

The above-indicated form is one form in which the operational direction of the actuator with respect to the neutral position is employed as the determination parameter. As explained above, in operating the actuator in the neutral direction, the actuator tends to be more easily operated than in a case wherein the actuator is operated in directions other than the neutral direction. The above-indicated form takes account of this fact. The present form is effective to suppress, in operating the actuator in the neutral direction, excessive moving of the operational position, i.e., overshooting of the operational position, while assuring sufficient response in operating the actuator in the counter-neutral direction. By suppressing or restraining the overshooting, it is possible to inhibit changing of the direction in which the actuator is operated, thereby inhibiting occurrence of abnormal noise, vibration or the like, of the actuator. In the present form, the supply power amount is restrained in the neutral-direction operational state, so that the stabilizer system is excellent in view of power saving.

(10) The stabilizer system according to any one of the above forms (1)-(9), wherein the control device determines, at least in a neutral-direction operational state in which the operational direction of the actuator is toward the neutral position, the supply power amount to the electric motor based on the at least one determination parameter.

(11) The stabilizer system according to the above form (10), wherein the control device determines, only in the neutral-direction operational state, the supply power amount to the electric motor based on the at least one determination parameter.

The above-indicated forms take account of phenomenon that the direction of the external input force to the actuator and the operational direction of the actuator agree with each other in the neutral-direction operational state as described above. Namely, each of the two forms indicated above may be considered as one form in which the supply power amount is determined based on the neutral position of the actuator. The determination parameter in the two forms is at least one of the operational position of the actuator and the steering speed. Due to the peculiarity of the above-indicated phenomenon in the neutral-direction operational state, the above-indicated two forms enjoy great merit of making the operation of the actuator appropriate by determination of the supply power amount based on the determination parameter.

(12) The stabilizer system according to the above form (10) or (11), wherein the at least one determination parameter includes at least the operational position of the actuator, and wherein the control device determines, in the neutral-direction operational state, the supply power amount to be a value that is smaller in a situation in which the operational position of the actuator is distant from the neutral position, than in a situation in which the operational position of the actuator is near to the neutral position.

As explained above, in the neutral-direction operational state, the operational direction of the actuator agrees with the direction of the external input force that acts on the actuator arising from the roll moment. Further, the external input force increases as the operational position of the actuator moves apart from the neutral position. Accordingly, in the neutral-direction operational state, when the operational position of the actuator is distant from the neutral position, there may be a high possibility of overshooting of the actual operational position of the actuator with respect to the target operational position thereof. In the present form, it is possible to effectively suppress such overshooting. Because the overshooting can be suppressed or restrained, it is possible to suppress changing of the direction in which the actuator is operated, thereby inhibiting the occurrence of abnormal noise, vibration or the like, of the actuator, as explained above. In the present system, the supply power amount can be made comparatively small, so that the system is excellent in view of power saving.

(13) The stabilizer system according to any one of the above forms (1)-(12), wherein the at least one determination parameter at least includes the steering speed, and wherein the control device determines the supply power amount to be a value that is larger in a situation in which the steering speed is large than in a situation in which the steering speed is smaller.

In the above-indicated form, the steering speed is employed as the determination parameter. As explained above, when the steering speed is large, the rate of change of the roll moment is large. In this form, the supply power amount is arranged to become large when the steering speed is large, for improving the response of the operation of the actuator, i.e., the response of the operation of the stabilizer apparatus. Where the supply power amount is determined according to the PI control rule or the PDI control indicated above, the integral-term component becomes a component for permitting the electric motor to exhibit force whose direction is opposite to the operational direction of the actuator in the neutral-direction operational state. Accordingly, the increase of the supply power amount in the neutral-direction operational state when the steering speed is large is particularly effective to improve the response of the operation of the actuator.

(14) The stabilizer system according to any one of the above forms (1)-(13), wherein the stabilizer bar includes a pair of stabilizer bar members each of which includes: a torsion bar portion disposed to extend in a width direction of the vehicle; and an arm portion which extends from the torsion bar portion so as to intersect the torsion bar portion and which is connected at a leading end thereof to one of the left and right wheels, and wherein the actuator changes, due to a change in the operational position thereof, a relative rotational angle of the torsion bar portions of the pair of stabilizer bar members, thereby changing the stiffness of the stabilizer bar with respect to the roll of the body of the vehicle.

(15) The stabilizer system according to the above form (14), wherein the actuator further includes: a decelerator for decelerating rotation of the electric motor down to relative rotation of the torsion bar portions of the pair of stabilizer bar members; and a housing which holds the electric motor and the decelerator, and wherein one end of the torsion bar portion of one of the pair of stabilizer bar members is connected to the housing so as to be unrotatable relative to the housing while one end of the torsion bar portion of the other of the pair of the stabilizer bar members is connected to an output portion of the decelerator so as to be unrotable to the output portion, thereby changing the relative rotational angle of the torsion bar portions of the pair of stabilizer bar members by the motor force generated by the electric motor.

In the above-indicated two forms, the structure of the stabilizer bar, the configuration of the actuator and so on are concretely limited. Both forms effectively restrain the roll of the vehicle body. Where the actuator is equipped with "decelerator", the mechanism of the decelerator is not particularly limited. Where the electric motor is a rotary motor and the decelerator is arranged to decelerate the rotation speed of the motor and transmit the decelerated rotation, there may be used a decelerator having a large transmission gear ratio (i.e., having a small output rotation speed with respect to an input rotation speed) and employing, for instance, a harmonic gear mechanism called as "HARMONIC DRIVE" (trademark) and also called as a strain wave gear ring mechanism, a cycloid decelerating mechanism, or a planetary gear mechanism of a multi-step type. The use of such a decelerator with a large transmission gear ratio leads to a reduction in the size of the motor and accordingly a reduction in the size of the actuator. In the above-indicated two forms, it is possible to employ, as the operational position of the actuator, the relative rotational angle of the torsion bar portions, i.e., the rotational position of the actuator. Further, as the operational direction of the actuator, the relative rotational direction of the torsion bar portions, i.e., the rotational direction of the actuator, can be employed.

BEST MODE FOR CARRYING OUT THE INVENTION

Figure 1:
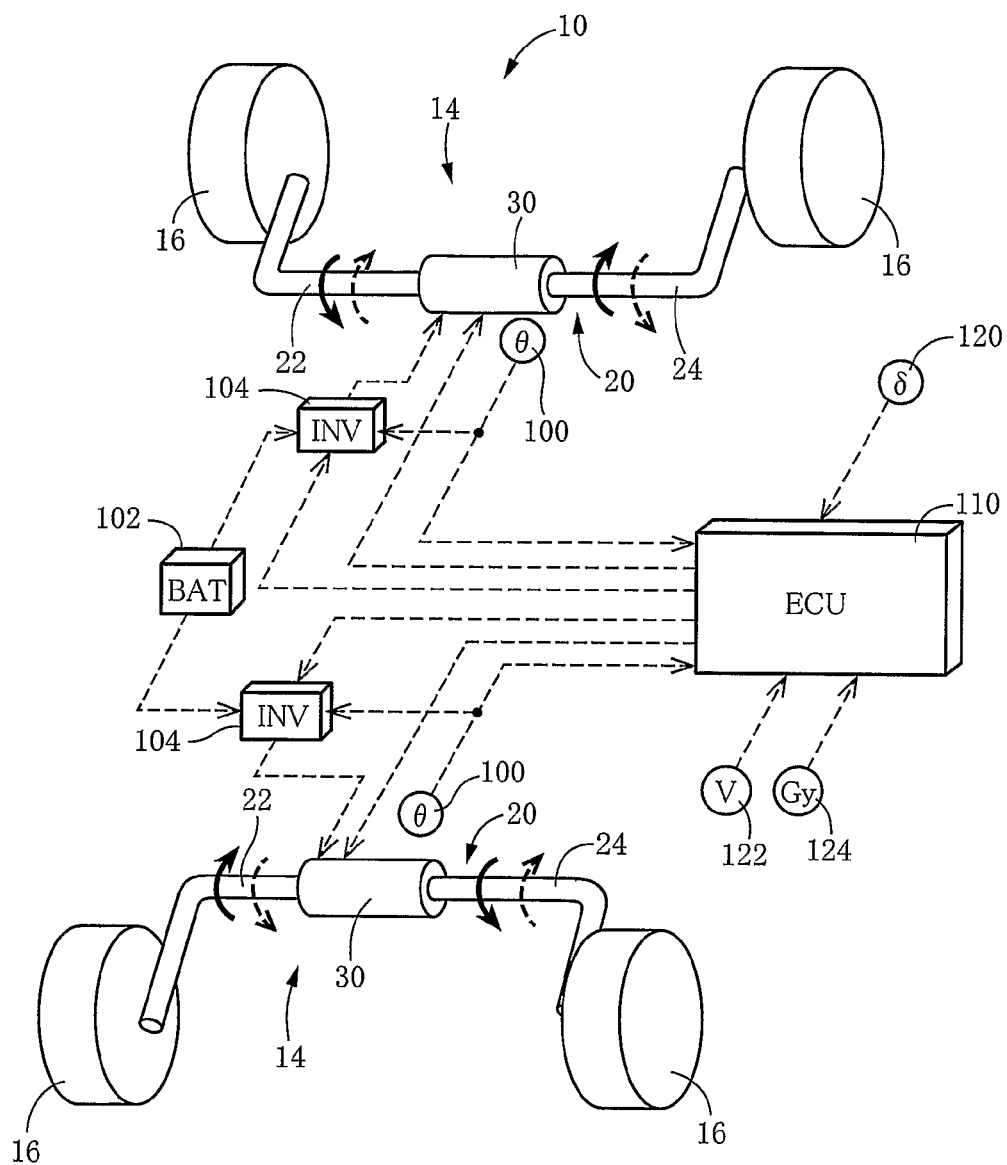
FIG. 1 is a schematic view showing an overall structure of a vehicle stabilizer system according to the embodiment of the present invention.

There will be described in detail one embodiment of the claimable invention, referring to the drawings. It is to be understood, however, that the invention is not limited to the following embodiment but may be embodied with various changes and modifications, such as those described in the FORMS OF THE INVENTION, which may occur to those skilled in the art.

1. Structure of Stabilizer System

FIG. 1 conceptually shows a stabilizer system 10 for a vehicle according to one embodiment of the claimable invention. The stabilizer system 10 includes two stabilizer apparatuses 14 which are disposed respectively on a front-wheel side and a rear-wheel side of the vehicle. Each stabilizer apparatus 14 includes a stabilizer bar 20 connected at opposite ends thereof to respective wheel holding members (FIG. 2) which respectively hold right and left wheels 16. The stabilizer bar 20 is divided at a middle portion thereof into two parts, i.e., a right stabilizer bar member 22 and a left stabilizer bar member 24. The pair of stabilizer bar members 22, 24 are connected rotatably relative to each other with an actuator 30 interposed therebetween. Roughly speaking, the stabilizer apparatus 14 is arranged such that the actuator 30 rotates the right and left stabilizer bar members 22, 24 relative to each other (as shown in arrows indicated by solid line and arrows indicated by broken line in FIG. 1), thereby changing apparent stiffness of the stabilizer bar 20 as a whole, for controlling or restraining the roll of the vehicle body.

Figure 2:
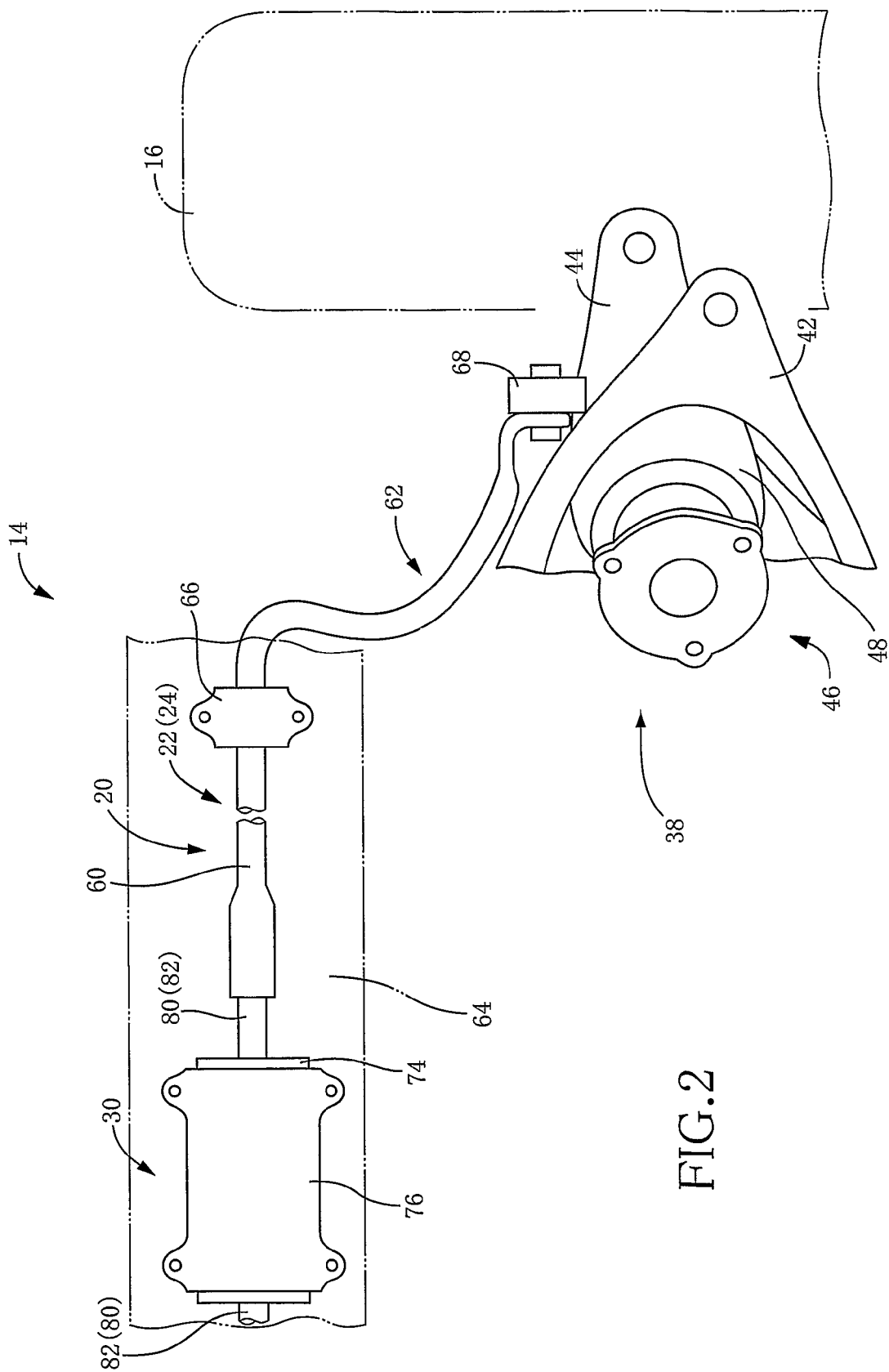
FIG. 2 is a schematic view showing a stabilizer apparatus of the stabilizer system of FIG. 1.

FIG. 2 schematically shows a portion of the stabilizer apparatus 14 ranging from its middle part in a width direction of the vehicle to a wheel 16 on one of the right side and the left side of the vehicle. The vehicle on which the present stabilizer system 10 is installed includes four independent suspension apparatuses 38 provided respectively for the four wheels 16. Each suspension apparatus 38 is a double wishbone type well known in the art and includes an upper arm 42 and a lower arm 44 which cooperate with each other to function as the wheel holding member. Each of the upper and lower arms 42, 44 is rotatably connected at one end thereof to a vehicle body and at the other end thereof to the corresponding wheel 16. Each of the upper and lower arms 42, 44 is pivotably moved or swung about the above-indicated one end (vehicle-body-side end) while the other end (wheel-side end) is moved generally in the vertical direction relative to the vehicle body, as the corresponding wheel 16 and the vehicle body move toward and away from each other (namely, as the wheel 16 and the vehicle body move relative to each other in the vertical direction). The suspension apparatus 38 further includes a shock absorber 46 and a suspension spring 48 (which is an air spring in the present embodiment). Each of the shock absorber 46 and spring 48 is connected at one end thereof to a mount portion on the vehicle-body side and at the other end thereof to the lower arm 44. The thus constructed suspension apparatus 38 elastically supports the corresponding wheel 16 and the vehicle body and has a function of generating damping force with respect to a vibration which is accompanied by the relative displacement between the wheel 16 and the vehicle body toward and away from each other.

The stabilizer apparatus 14 includes the pair of stabilizer bar members as mentioned above, i.e., the right stabilizer bar member 22 and the left stabilizer bar member 24. (In FIG. 2, one of the right and left bar members 22, 24 is shown.) Each of the right and left stabilizer bar members 22, 24 has a torsion bar portion 60 extending substantially in the width direction of the vehicle, and arm portion 62 formed integrally with the torsion bar portion 60 and intersecting the same 60 so as to extend generally in a frontward or a rearward direction of the vehicle. The torsion bar portion 60 of each stabilizer bar member 22, 24 is rotatably supported, at a position thereof near to the arm portion 62, by a support member 66 which is fixedly disposed at a stabilizer-apparatus mounting portion 64 that is a part of the vehicle body. Thus, the torsion bar portions 60 of the respective right and left stabilizer bar members 22, 24 are disposed coaxially relative to each other. Between respective ends of the torsion bar portions 60 of the right and left bar members 22, 24, which ends are located near to a widthwise middle portion of the vehicle, the actuator 30 is disposed. As explained below in detail, the respective ends of the torsion bar portions 60 are connected to the actuator 30. In the meantime, one end of each arm portion 62 remote from the corresponding torsion bar portion 60 is connected to a stabilizer-bar connecting portion 68 of the corresponding lower arm 44 so as to be rotatable relative to the same 68.

Figure 3:
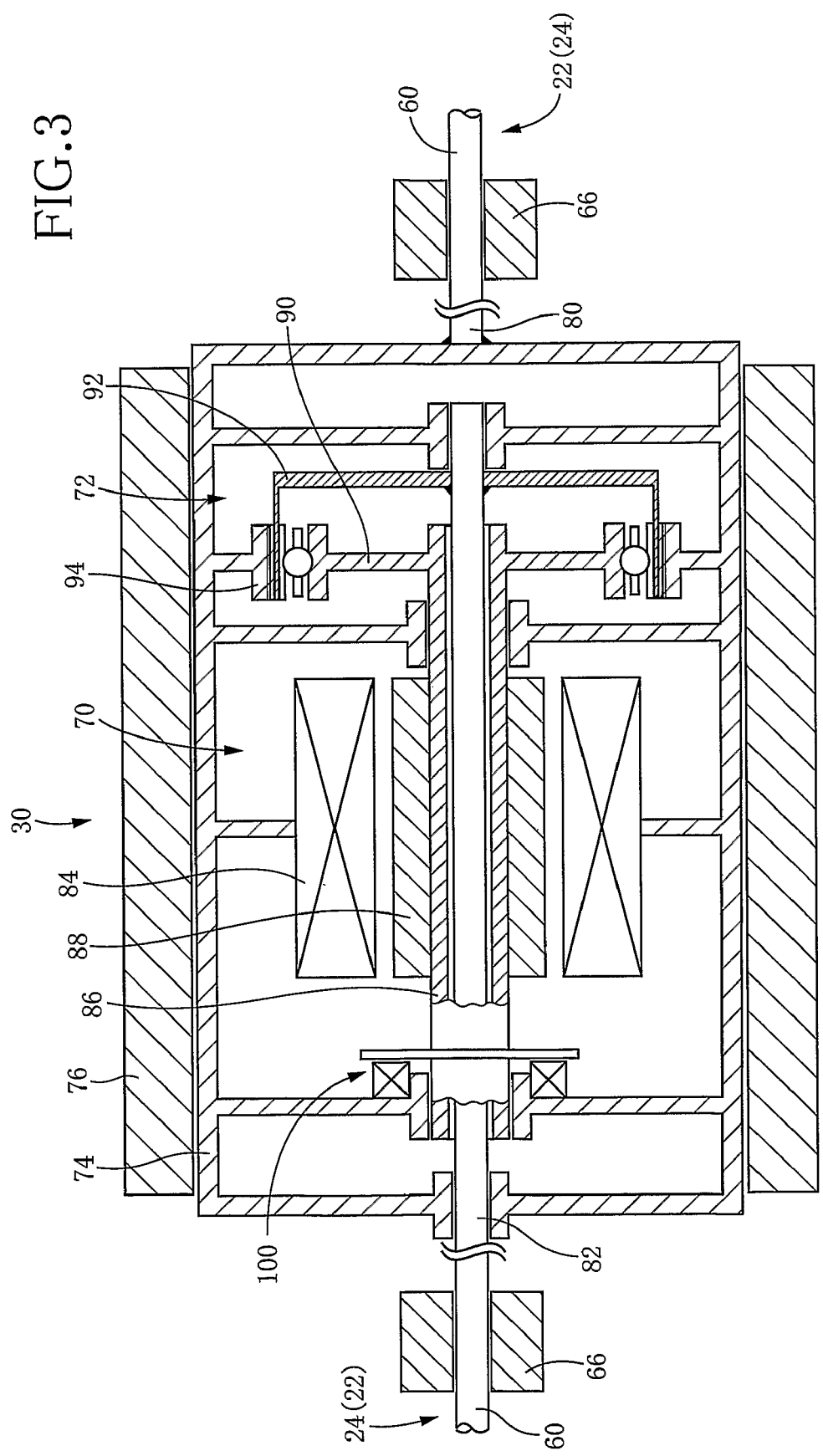
FIG. 3 is a schematic view in cross section showing an actuator of the stabilizer apparatus of FIG. 2.

As schematically shown in FIG. 3, the actuator 30 includes an electric motor 70 and a decelerator 72 connected to the electric motor 70 for decelerating rotation of the electric motor 70. The electric motor 70 and the decelerator 72 are disposed inside a housing 74 as an outer frame member of the actuator 30. The housing 74 is held, at the stabilizer-apparatus mounting portion 64 provided on the vehicle body, by a housing holding member 76 so as to be rotatable and immovable in the axial direction (i.e., substantially in the width direction of the vehicle) relative to the housing holding member 76. As understood from FIG. 2, two output shafts 80, 82 extend respectively from opposite ends of the housing 74. The output shafts 80, 82 are unrotatabley connected by serration engagement, at their leading ends remote from the housing 74 respectively to ends of the respective right and left bar members 22, 24. Further, as shown in FIG. 3, one 80 of the two output shafts 80, 82 is fixedly connected to one of the opposite ends of the housing 74 while the other 82 of the two output shafts 80, 82 is disposed so as to extend into the housing 74 and is held by the housing 74 so as to be rotatable and axially immovable relative to the same 74. One end of the output shaft 82 located within the housing 74 is connected to the decelerator 72 as explained below in detail. The output shaft 82 functions also as an output portion of the decelerator 72.

The electric motor 70 includes: a plurality of coils 84 fixedly disposed on one circumference along an inner circumferential surface of the cylindrical wall of the housing 74; a hollow motor shaft 86 rotatably held by the housing 74; and permanent magnets 88 fixedly disposed on one circumference along an outer circumferential surface of the motor shaft 86 so as to face the coils 84. The electric motor 70 is a motor in which each coil 84 functions as a stator and each permanent magnet 88 functions as a rotor, and is a three-phase DC brushless motor.

In the present embodiment, the decelerator 72 is constituted as a harmonic gear mechanism including a wave generator 90, a flexible gear 92, and a ring gear 94. The wave generator 90 includes an oval cam and ball bearings fitted on a periphery of the cam, and is fixed to one end of the motor shaft 80. The flexible gear 92 is a cup-like member whose cylindrical wall portion is elastically deformable. A plurality of teeth are formed on an outer circumference of the open end portion of the cup-like flexible gear 92. The flexible gear 92 is connected to the output shaft 82 described above and is held by the same 82. In detail, the output shaft 82 penetrates the motor shaft 86 and has an end portion extending from or beyond the one end of the motor shaft 86. To this end portion of the output shaft 82, a bottom portion of the flexible gear 92 is fixed, whereby the flexible gear 92 and the output shaft 82 are connected to each other. The ring gear 94 is a generally ring-like member and is fixed to the housing 74. A plurality of teeth are formed on an inner circumference of the ring gear 94. The number of teeth formed on the inner circumference of the ring gear 94 is slightly larger (e.g., larger by two) than the number of teeth formed on the outer circumference of the flexible gear 92. The flexible gear 92 is fitted at its cylindrical wall portion on the wave generator 90, and is elastically deformed into an oval shape. The flexible gear 92 meshes the ring gear 94 at two portions thereof corresponding to opposite ends of the long axis of the oval and does not mesh the same 94 at other portion thereof. With one rotation of the wave generator 90 (i.e., after rotation of the wave generator 90 by 360°), in other words, after one rotation of the motor shaft 86 of the electric motor 70, the flexible gear 92 and the ring gear 94 are rotated relative to each other by an amount corresponding to the difference in the number of teeth therebetween. Because the structure of the harmonic gear mechanism is known in the art, a detailed illustration of the decelerator 72 is dispensed with and its explanation is limited to brief one given above.

In the thus constructed stabilizer apparatus 14, where the vehicle body undergoes, due to turning of the vehicle, force which changes the distance between one of the right and left wheels 16 and the vehicle body and the distance between the other of the right and left wheels 16 and the vehicle body relative to each other, i.e., the roll moment, the actuator 30 receives force acting thereon which rotates the right stabilizer bar member 22 and the left stabilizer bar member 24 relative to each other, i.e., the external input force. In this instance, when the actuator 30 exerts force which is in balance with the external input force owing to force of the electric motor 70 that is generated by the electric motor 70, one stabilizer bar 20 constituted by the right and left stabilizer bar members 22, 24 is twisted. Elastic force generated by the twisting of the stabilizer bar 20 functions as counter force with respect to the roll moment, i.e., the roll-restraining moment. By changing, owing to the force of the electric motor 70, a relative rotational position of the output shafts 80, 82 of the actuator 30, namely, a rotational position (an operational position) of the actuator 30, a relative rotational position of the right and left stabilizer bar members 22, 24 is changed, whereby the roll amount of the vehicle body can be changed even where the vehicle body undergoes the same roll moment, in other words, even where the same roll-restraining moment is generated. The present stabilizer apparatus 14 is arranged such that the apparent stiffness of the stabilizer bar, i.e., the stabilizer stiffness, is changeable. The rotational position of the actuator 30 stated here means the following: A state in which no roll moment acts on the vehicle body is deemed as a normal state. Where the rotational position of the actuator 30 in the normal state is deemed as a neutral position, the rotational position of the actuator 30 indicates an amount of rotation, namely, an amount of operation, from the neutral position.

The actuator 30 is provided, in the housing 74, with a motor-rotational-angle sensor 100 for detecting a rotational angle of the motor shaft 86, i.e., a rotational angle of the electric motor 70. The motor-rotational-angle sensor 100 of the present actuator 30 is constituted principally by an encoder. A value detected by the sensor 100 is utilized in the control of the actuator 30, namely, in the control of the stabilizer apparatus 14, as an index indicating a relative rotational angle (relative rotational position) of the right and left stabilizer bar members 22, 24, in other words, as an index indicating the rotational position of the actuator 30.

To the electric motor 70 of the actuator 30, electric power is supplied from a battery 102 as a power source device. In the present stabilizer system 10, an inverter 104 is provided between the battery 102 and each stabilizer apparatus 14. Each inverter 104 functions as a drive circuit. Electric power is supplied to the electric motors 70 of the respective two stabilizer apparatuses 14 from the respective inverters 104. Because the electric motor 70 is driven at a constant voltage, the amount of power to be supplied to the electric motor 70 is changed by changing the amount of current to be supplied, and the force of the electric motor 70 corresponds to the amount of current supplied thereto. In this respect, the amount of current to be supplied is changed such that a ratio (duty ratio) of a pulse-on time to a pulse-off time by PWM (Pulse Width Modulation) is changed by the inverters 104.

As shown in FIG. 1, the present stabilizer system 10 includes a stabilizer electronic control unit (stabilizer ECU) 110 (hereinafter may be simply referred to as "the ECU 110") as a control device for controlling the operation of the stabilizer apparatus 14, in detail, the operation of the actuator 30. The ECU 110 is constituted principally by a computer including a CPU, a ROM, a RAM, etc. To the ECU 110, there are connected, in addition to the aforementioned motor-rotational-angle sensor 100, a steering-angle sensor 120 for detecting an operation angle of a steering wheel which is an operation amount of a steering operating member as a steering amount, a vehicle-speed sensor 122 for detecting a running speed of the vehicle (hereinafter may be simply referred to as "vehicle speed"), and a lateral-acceleration sensor 124 for detecting actual lateral acceleration which is lateral acceleration actually generated in the vehicle. In FIG. 1, these sensors 100, 120, 122, 124 are shown as θ, δ, v and Gy, respectively. The ECU 110 is connected also to each of the inverters 104, whereby the ECU 110 controls the rotational position of each actuator 30 by controlling each inverter 104. In the ROM of the computer of the ECU 110, there are stored a stabilizer control program (which will be explained), various data relating to the control of the stabilizer apparatus 14, and so on.

The present stabilizer system 10 has the two stabilizer apparatuses 14 respectively for the front wheel side and the rear wheel side of the vehicle. The two stabilizer apparatuses 14 are individually controlled in accordance with determined roll stiffness distribution and respectively generate the roll-restraining moment while being individually controlled. In the following description, unless otherwise specified, the two stabilizer apparatuses 14 are construed identical in structure and operation, in the interest of brevity.

2. Control of the Stabilizer Apparatus

The present stabilizer apparatus 14 is controlled by the actuator 30 which is controlled such that an actual rotational position of the actuator 30 coincides with a target rotational position, for exhibiting the stabilizer stiffness corresponding to the roll moment generated in the vehicle body. In this control, the electric current to be supplied to the electric motor 70 is determined by first determining a basic supply current and then correcting the basic supply current while taking account of ease with which the actuator 30 is operated (i.e., operation ease), a speed at which the actuator 30 is operated (i.e., operation speed), etc. That is, the present stabilizer apparatus 14 is controlled such that the actual rotational position of the actuator 30 coincides with the target rotational position while the determined supply current is supplied to the electric motor 70. Hereinafter, the control will be explained in detail.

i) Determination of the Target Rotational Position

Since there is correspondence relationship between the rotational position of the actuator 30 and a motor rotational angle which is a rotational angle of the electric motor 70, the motor rotational angle is treated as the rotational position of the actuator 30, and the control is executed based on the motor rotational angle. The target motor rotational angle θ* that corresponds to a target rotational position of the actuator 30 is determined based on lateral acceleration that is a roll-moment index amount, in detail, control-use lateral acceleration Gy* as a parameter for the control. Described more specifically, the control-use lateral acceleration Gy* is determined according to the following formula on the basis of: the estimated lateral acceleration Gyc estimated based on the operation angle of the steering wheel and the vehicle running speed; and the actual lateral acceleration Gyr actually measured (Each of the estimated lateral acceleration Gyc and the actual lateral acceleration Gyr is one kind of the roll-moment index amount.)

$$Gy^* = K_1 \cdot Gyc + K_2 \cdot Gyr$$

wherein $K_1$ and $K_2$ are control gains and set at respective values such that the control-use lateral acceleration Gy* suitable for the control of the stabilizer apparatus 14 is obtained. On the basis of the thus determined control-use lateral acceleration Gy*, the target motor rotational angle θ* is determined according to a predetermined relationship between control-use lateral acceleration Gy* and target motor rotational angle θ*.

ii) Determination of the Basic Supply Current

The basic supply current $i_O^*$ is determined according to a technique of feed-back control based on the motor rotational angle. In detail, there is initially identified motor-rotational-angle deviation Δθ (=θ*−θ) which is deviation of the actual motor rotational angle θ (corresponding to the actual rotational position of the actuator 30) with respect to the target motor rotational angle θ* and which corresponds to operational-position deviation of the actuator 30. Then, on the basis of the identified motor-rotational-angle deviation Δθ, the basic supply current $i_O^*$ is determined according to the following formula:

$$i_O^* = Ka \cdot \Delta\theta + Kb \cdot Int(\Delta\theta)$$

The above-indicated formula is according to a PI control rule. The first term and the second term in the formula respectively mean a proportional-term component $i_{OP}^*$ and an integral-term component $i_{OI}^*$, in the basic supply current $i_O^*$, and "Ka", "Kb" are a proportional gain and an integral gain, respectively. Further, "Int(Δθ)" corresponds to an integral value of the motor-rotational-angle deviation Δθ.

Figure 4:
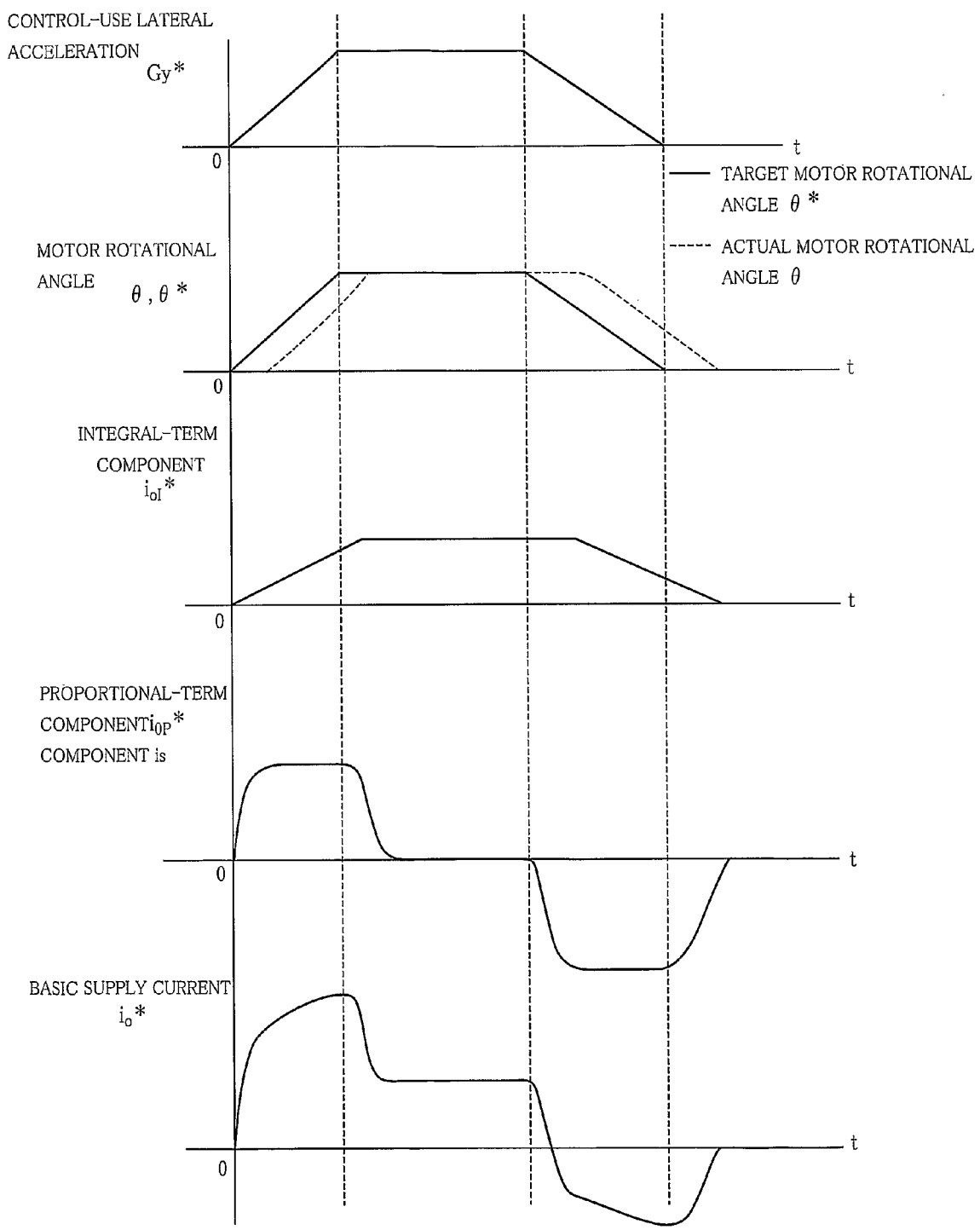
FIG. 4 is a chart schematically showing changes in lateral acceleration generated in the vehicle, an electric current to be supplied to an electric motor that constitutes the actuator, etc., in one turning motion of the vehicle.

FIG. 4 schematically shows a relationship among control-use lateral acceleration Gy*, target motor rotational angle θ*, actual motor rotational angle θ, proportional-term component $i_{OP}^*$, integral-term component $i_{OI}^*$ and basic supply current $i_O^*$, in one turning motion of the vehicle in which the running speed is kept constant. In the graph, the abscissa axis represents a lapse of time. As is apparent from the graph, at an initial period of the turning in which the control-use lateral acceleration Gy* increases, the target motor rotational angle θ* increases in accordance with an increase in the control-use lateral acceleration Gy*, and the proportional-term component $i_{OP}^*$ and the integral-term $i_{OI}^*$ increase in accordance with occurrence of the above-indicated motor-rotational-angle deviation Δθ, resulting in an increase in the basic supply current $i_O^*$. As a result, the roll-restraining moment generated by the stabilizer apparatus 14 increases while the actuator 30 is operated in a counter-neutral direction in which the rotational position of the actuator 30 moves apart from a neutral position. At a middle period of the turning in which the control-use lateral acceleration Gy* does not change, the target motor rotational angle θ* does not change, and the proportional-term component $i_{OP}^*$ becomes substantially 0. In this connection, the integral-term component $i_{OI}^*$ functions as a component which permits the electric motor 70 to exhibit force (position-marinating force) for placing the actuator 30 into a state in which the actuator 30 is not operated even by the external input force. In the graph, at the middle period of the turning, though the proportional-term component $i_{OP}^*$ is substantially 0, the rotational position of the actuator 30 is maintained by the integral-term component $i_{OI}^*$, whereby the stabilizer apparatus 14 is placed in a state in which the stabilizer apparatus 14 exhibits constant roll-restraining moment. At a final period in which the control-use lateral acceleration Gy* decreases, the sign (+, −) of the proportional-term component $i_{OP}^*$ is reversed in order to permit the actuator 30 to be operated in a neutral direction toward the neutral position. In the graph, an absolute value of the proportional-term component $i_{OP}^*$ is larger than that of the integral-term component $i_{OI}^*$, and the basic supply current $i_O^*$ by which the actuator 30 is operated in the neutral direction by the electric motor 70 is supplied to the same 70. As a result, the roll-restraining moment generated by the stabilizer apparatus 14 is decreased while the actuator 30 is operated in the neutral direction.

In the present embodiment, the basic supply current $i_O^*$ is determined according to the PI control rule. The basic supply current $i_O^*$ may be determined according to a PDI control rule. In this instance, the basic supply current $i_O^*$ may be determined according to the following formula, for instance:

$$i_O{}^* = Ka \cdot \Delta\theta + Kb \cdot Int(\Delta\theta) + Kc \cdot \Delta\theta'$$

wherein "Kc" is a differential gain, and the third term means a differential-term component.

iii) Correction of the Basic Supply Current

As explained above, the external input force arising from the roll-moment that acts on the vehicle body is applied to the actuator 30. The external input force acts on the actuator 30 in a direction in which the actuator 30 is operated in the neutral direction. Accordingly, by taking the above-described turning motion of the vehicle as an example, the operational direction of the actuator 30 and the direction of the external input force are opposite to each other at the initial period of the turning whereas those directions agree with each other at the final period of the turning. Namely, the ease with which the actuator 30 is operated differs depending upon the operational direction, i.e., the rotational direction, of the actuator 30 with respect to the neutral position. In view of this, in the control of the present stabilizer apparatus 14, the basic supply current $i_O{}^*$ is corrected such that a value of the supply current is smaller in a neutral-direction operational state in which the rotational direction of the actuator 30 with respect to the neutral position is the neutral direction, than a value of the supply current in a counter-neutral-direction operational state in which the rotational direction of the actuator 30 with respect to the neutral position is the counter-neutral direction, for the purpose of suppressing the overshooting of the operational position of the actuator 30, for instance. That is, in the control of the present stabilizer apparatus 14, the operational direction of the actuator 30 with respect to the neutral direction is used as a determination parameter based on which the supply current to the electric motor 70 is determined.

The stabilizer apparatus 14 is arranged such that the external input force increases with an increase in the roll moment acting on the vehicle body and such that the rotational position of the actuator 30 moves apart from the neutral position for increasing the stabilizer stiffness. Therefore, the external input force increases with an increase in a distance of the rotational position of the actuator 30 from the neutral position. That is, the ease with which the actuator 30 is operated also differs depending upon the operational position of the actuator 30. In the light of this, in the control of the present stabilizer apparatus 14, the basic supply current $i_O{}^*$ is corrected, in the neutral-direction operational state, such that the value of the supply current is smaller in a situation in which the rotational position of the actuator 30 is distant from the neutral position, than in a situation in which the rotational position is near to the neutral position, for the purpose of suppressing the overshooting of the rotational position of the actuator 30, for instance. That is, in the control of the present stabilizer apparatus 14, the rotational position of the actuator 30 is used as the determination parameter on the basis of which the supply current to the electric motor 70 is determined.

Moreover, the present stabilizer apparatus 14 is actively controlled for changing the stabilizer stiffness corresponding to the change in the roll moment. Accordingly, it is desirable that the operational speed, i.e., the rotational speed, of the actuator 30 be suitably changed depending upon a rate of change in the roll moment. For instance, when the steering speed is large, the actuator 30 is preferably operated rapidly. In view of this, in the present stabilizer apparatus 14, the basic supply current $i_O{}^*$ is corrected such that the value of the supply current is larger in a situation wherein the steering speed is large, than in a situation wherein the steering speed is small, for the purpose of improving the response of the operation of the actuator 30, for instance. In other words, in the control of the present stabilizer apparatus 14, the steering speed used as the determination parameter on the basis of which the supply current to the electric motor 70 is determined. In the control according to the present embodiment, the correction of the basic supply current $i_O{}^*$ based on the steering speed is conducted only in the neutral-direction operational state, for the reasons that the operation of the actuator 30 tends to be interfered due to the presence of the integral-term component $i_{OI}{}^*$, for instance.

The determination of the supply current i* by the correction of the basic supply current $i_O{}^*$ is conducted according to the following two formulas:

$$i^* = K_{D1} \cdot K\theta \cdot K_V \cdot i_O{}^*$$

$$i^* = K_{D2} \cdot i_O{}^*$$

The first one of the above-indicated two formulas is a determination formula in the neutral-direction operational state and the second one of the two formulas is a determination formula in a state which excludes the neutral-direction operational state and which includes the counter-neutral-direction operational state. Namely, in the control of the present stabilizer apparatus 14, the mutually different formulas are employed in the neutral-direction operational state and the state other than the neutral-direction operational state. The judgment as to whether the present operational state is the neutral-direction operational state or not is made by a relationship between target motor rotational angle θ* and actual motor rotational angle θ.

Figure 5:
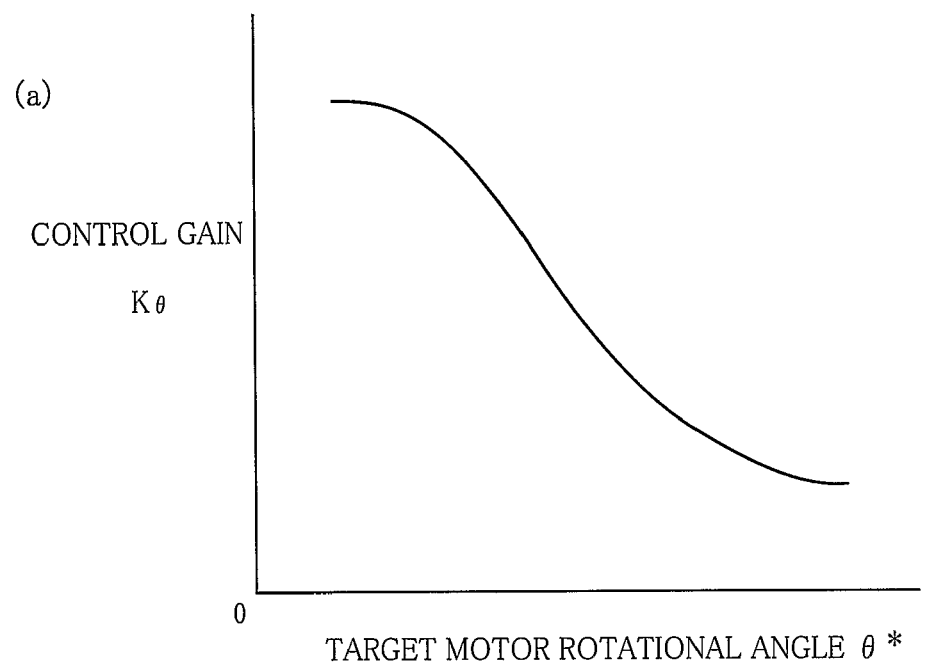
FIG. 5(a) is a schematic view showing a relationship between an operational position of the actuator and a control gain that depends thereupon and FIG. 5(b) is a schematic view showing a relationship between a steering speed and a control gain that depends thereupon.
Figure 5:
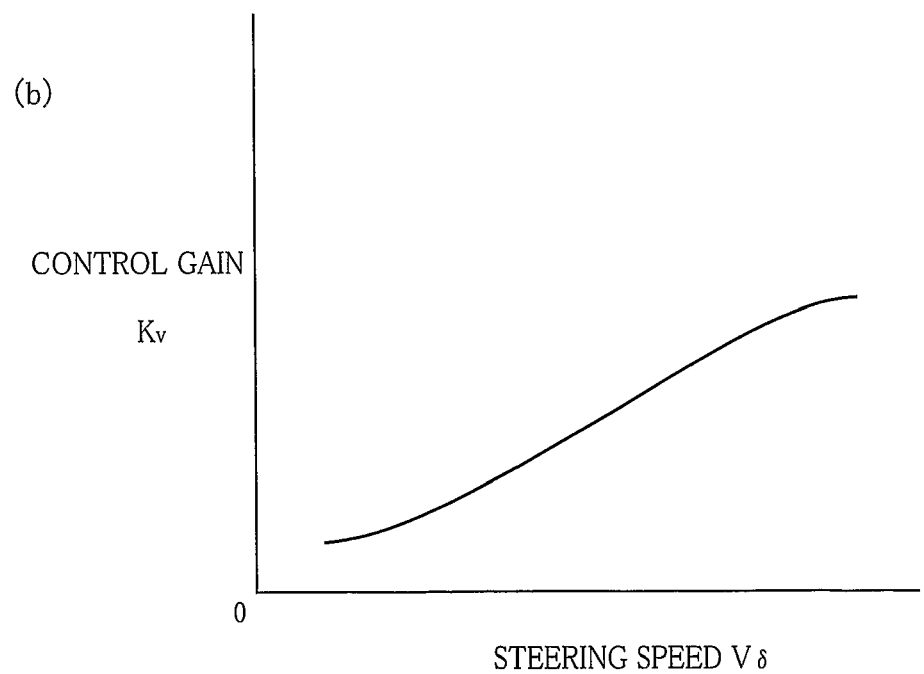

In the above-indicated two formulas, "$K_{D1}$" and "$K_{D2}$" are control gains that depend on the rotational direction of the actuator 30 with respect to the neutral position thereof. In the present control, $K_{D1}$ is made smaller than $K_{D2}$ ($K_{D1} < K_{D2}$), and the supply current i* in the neutral-direction operational state is determined to be a value smaller than the supply current i* in the state other than the neutral-direction operational state if influences of the correction by other control gains Kθ, $K_v$ are excluded. "Kθ" is a control gain that depends on the rotational position of the actuator 30, strictly, a control gain that depends on the target motor rotational angle θ*. The control gain Kθ is set to be a value which decreases with an increase in the target motor rotational angle θ*, as shown in FIG. 5(a). Accordingly, the supply current i* is determined to be a value which decreases with an increase in the distance of the rotational position of the actuator 30 from the neutral position if influences of the correction by other control gains $K_{D1}$, $K_v$ are excluded. "$K_v$" is a control gain that depends on the steering speed vδ and set to be a value which increases with an increase in the steering speed vδ, as shown in FIG. 5(b). Accordingly, the supply current i* is determined to be a value which increases with an increase in the steering speed vδ if influences of the correction by other control gains $K_{D1}$, Kθ are excluded.

In the present embodiment, the electric current to be supplied to the electric motor 70 is determined by correcting the basic supply current based on the three determination parameters, i.e., the rotational direction of the actuator 30 with respect to the neutral position, the rotational position of the actuator 30 and the steering speed. The supply current may be determined by correcting the basic supply current based on any one of or any two of those three determination parameters. In the present embodiment, the correction based on the rotational position of the actuator 30 and the correction based on the steering speed are conducted only in the neutral-direction operational state. For instance, the correction based on the steering speed may be conducted in the state other than the neutral-direction operational state. Further, the correction based on the rotational position of the actuator 30 may be conducted in the counter-neutral-direction operational state. In this instance, the correction may be conducted such that the supply current increases with an increase in the distance of the rotational position of the actuator 30 from the neutral position, contrary to the case of the correction in the neutral-direction operational state.

3. Stabilizer Control Program

Figure 6:
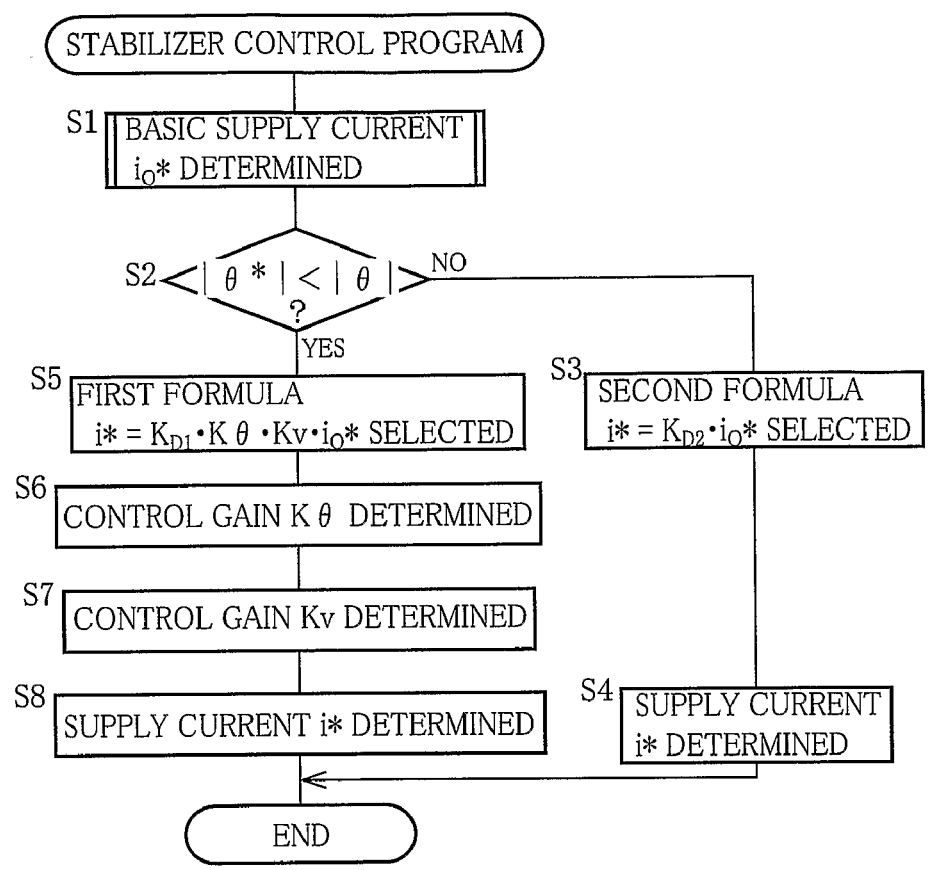
FIG. 6 is a flow chart showing a stabilizer control program implemented for controlling the stabilizer apparatus.

The control of the present stabilizer system 10 is executed such that a stabilizer control program indicated by a flow chart of FIG. 6 is repeatedly implemented by the ECU 110 at short time intervals (e.g., time intervals ranging from several milliseconds to several tens of milliseconds) with an ignition switch placed in an ON state. Hereinafter, the flow of the stabilizer control will be explained in detail referring to the flow chart.

Figure 7:
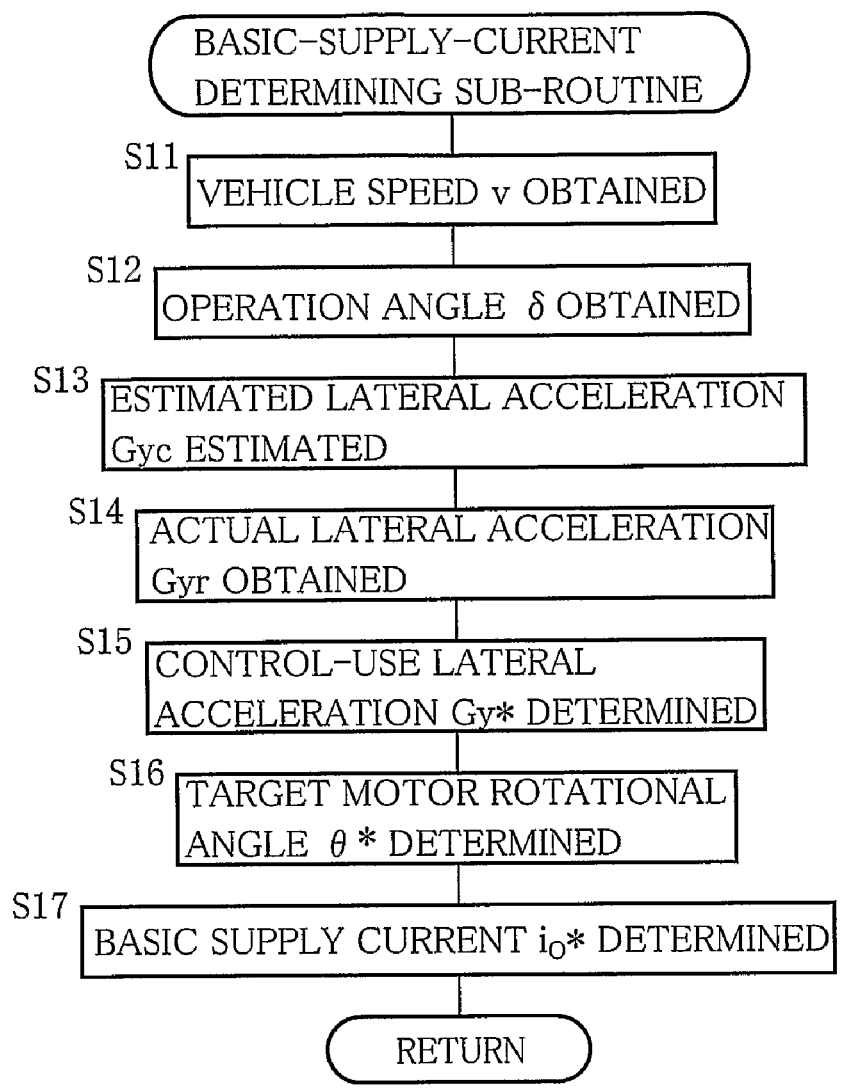
FIG. 7 is a flow chart showing a basic-supply-current determining sub-routine implemented in the stabilizer control program.

In the stabilizer control program, step S1 ("step" is omitted where appropriate) is initially implemented to execute a basic-supply-current-determining sub-routine indicated by a flow chart of FIG. 7. In this sub-routine, initially in S11, a vehicle speed v is obtained based on a value detected by the vehicle-speed sensor 122. In the following S12, an operation angle δ of the steering wheel is obtained based on a value detected by the steering-angle sensor 120. Next, in S13, estimated lateral acceleration Gyc is estimated based on the vehicle speed v and the operation angle δ. The ECU 110 stores map data which relates to estimated lateral acceleration Gyc and which uses vehicle speed v and operation angle δ as parameters. The estimated lateral acceleration Gyc is obtained by referring to the map data (look-up data). Subsequently, in S14, there is obtained actual lateral acceleration Gyr that is lateral acceleration actually generated in the vehicle body, on the basis of a value detected by the lateral-acceleration sensor 124.

Next, in S15, control-use lateral acceleration Gy* is determined based on the estimated lateral acceleration Gyc and the actual lateral acceleration Gyr. Then, in S16, there is determined a target motor rotational angle θ* of the electric motor 70 based on the determined control-use lateral acceleration Gy*. The ECU 110 stores map data of target motor rotational angle θ* which uses control-use lateral acceleration Gy* as a parameter. The target motor rotational angle θ* is determined referring to the map data. As explained above, the rotational angle of the motor 70 corresponds to the rotational position of the actuator 30. In the present control program, the control of the rotational position of the actuator 30 is actually executed based on the rotational angle of the motor 70. Subsequently, in S17, a basic supply current $i_O^*$ is determined according to the above-indicated formula relating to the PI control rule. Thus, the implementation of the sub-routine is completed.

After completion of the implementation of the basic-supply-current-determining sub-routine, it is judged in S2 whether or not an absolute value of the target motor rotational angle θ* is smaller than an absolute value of an actual motor rotational angle θ. Where the absolute value of the target motor rotational angle θ* is equal to or larger than the absolute value of the actual motor rotational angle θ, it is identified that the present state is not the neutral-direction operational state. Then, S3 is implemented to select the second one of the above-indicated two formulas for determining the supply current i*, and there is conducted, in S4, calculation according to the selected formula, whereby the supply current i* is determined. The thus determined supply current i* is transmitted as a command value to the inverters 104, and one execution of the present program is terminated.

Where it is judged in S2 that the absolute value of the target motor rotational angle θ* is smaller than the absolute value of the actual motor rotational angle θ, it is identified that the present state is the neutral-direction operational state. In this instance, S5 is implemented to select the first one of the above-indicated determination formulas. Subsequently, in S6, the control gain Kθ is determined on the basis of the target motor rotational angle θ* determined as described above, referring to the map data set as shown in FIG. 5(a). Then, in S7, there is identified a steering speed vδ on the basis of a difference between the operation angle δ obtained in the present execution of the program and the operation angle δ obtained in the preceding execution of the program. On the basis of the identified operation speed vδ, the control gain $K_v$ is determined referring to the map data set as shown in FIG. 5(b). Subsequently, there is conducted, in S8, calculation according to the selected first formula, whereby the supply current i* is determined. As in the above case, the determined supply current i* is transmitted as a command value to the inverters 104, and one execution of the present program is terminated.

4. Functional Structure of the Control Apparatus

Figure 8:
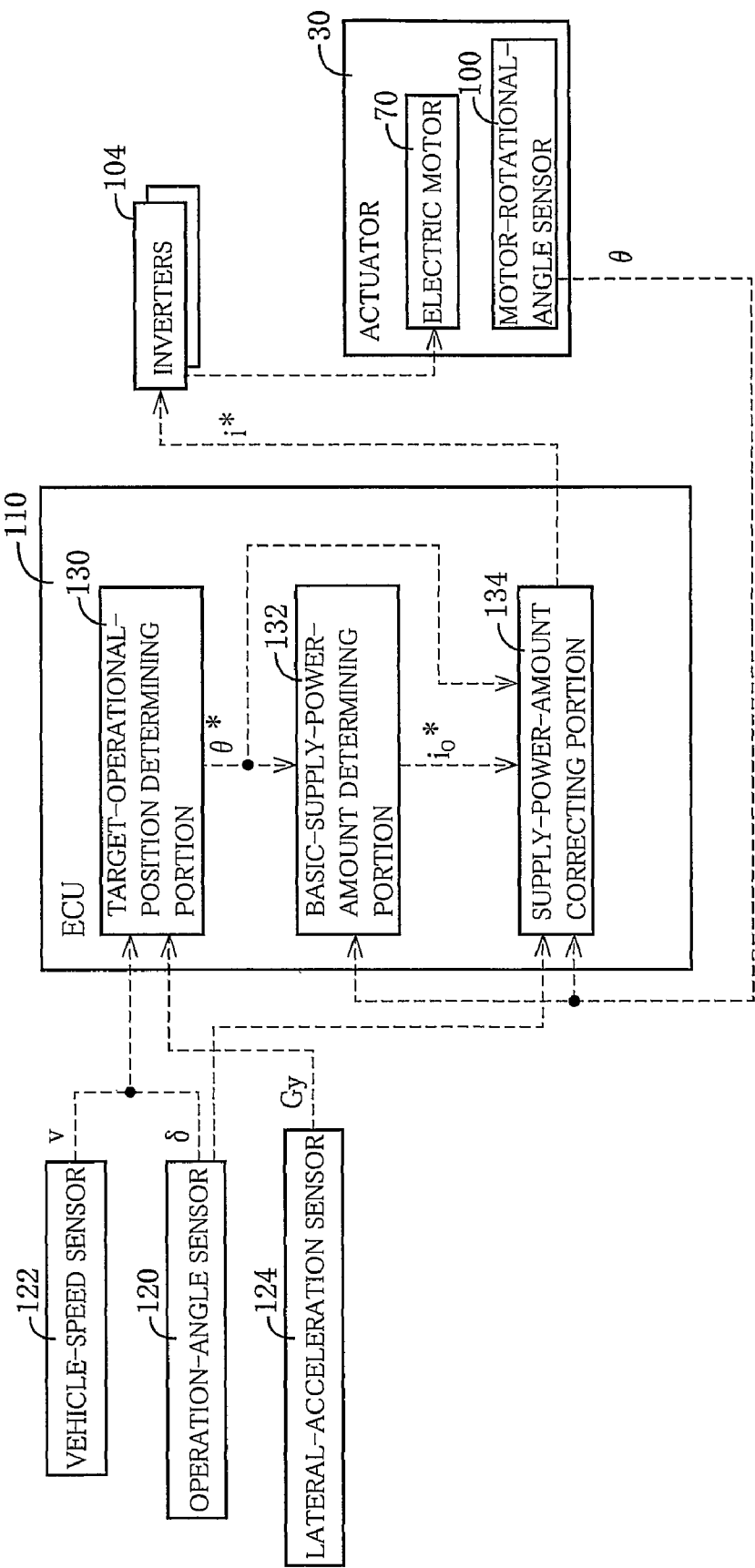
FIG. 8 is a block diagram showing functions of a stabilizer electronic control unit of the stabilizer system of FIG. 1.

The ECU 110 as the control apparatus of the present stabilizer system 10 functioning by execution of the stabilizer control program explained above may be considered to have functional structure shown in FIG. 8 from the standpoint of the proceeding to be executed. According to the functional structure, the ECU 110 includes: a target-operational-position determining portion 130 as a functional portion which executes the proceeding in S11-S16, namely, a functional portion which determines the target motor rotational angle θ*, i.e., the target rotational position of the actuator 30; a basic-supply-power-amount determining portion 132 as a functional portion which determines the basic supply current $i_O^*$ that is a basis of the supply current i* to the electric motor 70; and a supply-power-amount correcting portion 134 as a functional portion which executes the proceeding of S3-S8, namely, a functional portion which corrects the basic supply current $i_O^*$ and determines the supply current i* to the motor 70.

The invention claimed is:

1. A stabilizer system for a vehicle comprising:
    a stabilizer bar connected to left and right wheels at respective opposite ends thereof;
    an actuator which has an electric motor and which changes, owing to motor force generated by the electric motor, stiffness of the stabilizer bar with respect to roll of a body of the vehicle according to an operational position of the actuator; and
    a control device which controls the actuator such that an actual operational position of the actuator coincides with a target operational position while controlling a supply power amount to be supplied to the electric motor,
    wherein the control device determines the supply power amount to the electric motor based on at least one determination parameter which at least includes an operational direction of the actuator with respect to a neutral position.

2. The stabilizer system according to claim 1, wherein the at least one determination parameter further includes an operational position of the actuator.

3. The stabilizer system according to claim 1, wherein the at least one determination parameter further includes a steering speed.

4. The stabilizer system according to claim 1, wherein the control device includes a target-operational-position determining portion which determines the target operational position based on a roll-moment index amount which indicates roll moment that acts on the body of the vehicle.

5. The stabilizer system according to claim 1, wherein the control device includes, for determining the supply power amount to the electric motor, a basic-supply-power-amount determining portion which determines a basic supply power amount as a basis of the supply power amount to the electric motor and a supply-power-amount correcting portion which corrects the base supply power amount based on the at least one determination parameter.

6. The stabilizer system according to claim 5, wherein the basic-supply-power-amount determining portion determines the basic supply power amount based on an operational-position deviation of the actual operational position from the target operational position.

7. The stabilizer system according to claim 6, wherein the basic-supply-power-amount determining portion determines the basic supply power amount according to one of a PI control rule based on the operational-position deviation and a PDI control rule based on the operational-position deviation.

8. The stabilizer system according to claim 1,
wherein the control device determines the supply power amount to be a value that is smaller in a neutral-direction operational state in which the operational direction of the actuator is toward the neutral position, than in a counter-neutral-direction operational state in which the operational direction of the actuator is away from the neutral position.

9. The stabilizer system according to claim 1,
wherein the at least one determination parameter further includes at least one of an operational position of the actuator and a steering speed, and
wherein the control device determines, at least in a neutral-direction operational state in which the operational direction of the actuator is toward the neutral position, the supply power amount to the electric motor based on at least one of the operational position of the actuator and the steering speed.

10. The stabilizer system according to claim 9, wherein the control device determines, only in the neutral-direction operational state, the supply power amount to the electric motor based on at least one of the operational position of the actuator and the steering speed.

11. The stabilizer system according to claim 9,
wherein the at least one determination parameter further include the operational position of the actuator, and
wherein the control device determines, in the neutral-direction operational state, the supply power amount to be a value that is smaller in a situation in which the operational position of the actuator is distant from the neutral position, than in a situation in which the operational position of the actuator is near to the neutral position.

12. The stabilizer system according to claim 9,
wherein the at least one determination parameter further includes the steering speed, and
wherein the control device determines, in the neutral-direction operational state, the supply power amount to be a value that is larger in a situation in which the steering speed is large than in a situation in which the steering speed is smaller.

13. The stabilizer system according to claim 1,
wherein the stabilizer bar includes a pair of stabilizer bar members each of which includes: a torsion bar portion disposed to extend in a width direction of the vehicle; and an arm portion which extends from the torsion bar portion so as to intersect the torsion bar portion and which is connected at a leading end thereof to one of the left and right wheels, and
wherein the actuator changes, due to a change in the operational position thereof, a relative rotational angle of the torsion bar portions of the pair of stabilizer bar members, thereby changing the stiffness of the stabilizer bar with respect to the roll of the body of the vehicle.

14. The stabilizer system according to claim 13,
wherein the actuator further includes: a decelerator for decelerating rotation of the electric motor down to relative rotation of the torsion bar portions of the pair of stabilizer bar members; and a housing which holds the electric motor and the decelerator, and
wherein one end of the torsion bar portion of one of the pair of stabilizer bar members is connected to the housing so as to be unrotatable relative to the housing while one end of the torsion bar portion of the other of the pair of the stabilizer bar members is connected to an output portion of the decelerator so as to be unrotatable to the output portion, thereby changing the relative rotational angle of the torsion bar portions of the pair of stabilizer bar members by the motor force generated by the electric motor.

15. The stabilizer system according to claim 1, further comprising an encoder that detects a rotational angle of a shaft of the electric motor.

16. The stabilizer system according to claim 8, wherein
i) an electric current provided to the actuator is defined by a first relationship to a rotational angle of the actuator when the operational direction of the actuator is toward the neutral position, and
ii) the electric current is defined by a second relationship to the rotational angle of the actuator, different from the first relationship, when the operational direction of the actuator is away from the neutral position.

* * * * *